(12) United States Patent
Sheynblat et al.

(10) Patent No.: US 9,357,043 B2
(45) Date of Patent: *May 31, 2016

(54) SENSOR-BASED USER INTERFACE CONTROL

(71) Applicant: QUALCOMM Incorporated, San Diego, CA (US)

(72) Inventors: Leonid Sheynblat, Hillsborough, CA (US); John T. Larkin, Sunnyvale, CA (US); Deepak R. Chandra, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/167,646

(22) Filed: Jan. 29, 2014

(65) Prior Publication Data

US 2014/0145943 A1 May 29, 2014

Related U.S. Application Data

(63) Continuation of application No. 13/242,620, filed on Sep. 23, 2011, now Pat. No. 8,644,884.

(60) Provisional application No. 61/515,263, filed on Aug. 4, 2011.

(51) Int. Cl.
*H04M 1/00* (2006.01)
*H04M 1/02* (2006.01)
(Continued)

(52) U.S. Cl.
CPC ........... *H04M 1/0281* (2013.01); *G06F 1/1626* (2013.01); *G06F 1/1694* (2013.01); *G06F 3/017* (2013.01); *G06F 3/0346* (2013.01)

(58) Field of Classification Search
CPC .......................... G06F 1/1694; H04M 1/0281
USPC .................................. 455/566; 345/156, 158
See application file for complete search history.

(56) References Cited

U.S. PATENT DOCUMENTS 6,538,636 B1 3/2003 Harrison
7,701,442 B2 4/2010 Wong et al.
(Continued)

FOREIGN PATENT DOCUMENTS

CN 1680996 A 10/2005
EP 2284647 A2 2/2011
(Continued)

OTHER PUBLICATIONS

Hinckley, et al., "Sensing Techniques for Mobile Interaction," ACM UIST 2000, Symposium on User Interface Software and Technology, CHI Letters 2 (2), pp. 91-100.
(Continued)

*Primary Examiner* — Lee Nguyen
(74) *Attorney, Agent, or Firm* — Silicon Valley Patent Group LLP

(57) ABSTRACT

Methods and devices for sensor-based user interface control are disclosed. In one embodiment, a method for determining a characteristic of handedness includes sensing a rotation of a mobile device, determining a direction of rotation based at least in part on accessing information indicative of a first position state prior to sensing the rotation and accessing information indicative of a second position state subsequent to sensing the rotation, and determining the characteristic of handedness based at least in part on the direction of rotation, the first position state, and the second position state. The characteristic of handedness includes one of a left handedness or right handedness. The method further includes determining a user interface mode based on the characteristic of handedness determined, and controlling the mobile device in accordance with the user interface mode determined.

21 Claims, 10 Drawing Sheets

(51) Int. Cl.
*G06F 1/16* (2006.01)
*G06F 3/01* (2006.01)
*G06F 3/0346* (2013.01)
*H04B 1/38* (2015.01)

(56) References Cited

U.S. PATENT DOCUMENTS

| | | | |
|---|---|---|---|
| 7,809,214 B2 | 10/2010 | Disatnik et al. | |
| 8,644,884 B2 * | 2/2014 | Sheynblat et al. | 455/566 |
| 2005/0219220 A1 | 10/2005 | Kishi et al. | |
| 2009/0198132 A1 | 8/2009 | Pelissier et al. | |
| 2010/0088061 A1 | 4/2010 | Horodezky et al. | |
| 2010/0097331 A1 | 4/2010 | Wu | |
| 2011/0032202 A1 | 2/2011 | Aoyagi et al. | |
| 2011/0159915 A1 | 6/2011 | Yano et al. | |
| 2011/0169868 A1 | 7/2011 | Amemiya et al. | |
| 2013/0035139 A1 | 2/2013 | Sheynblat et al. | |

FOREIGN PATENT DOCUMENTS

| | | |
|---|---|---|
| JP | 2011034538 A | 2/2011 |
| JP | 2011133416 A | 7/2011 |
| JP | 2012023554 A | 2/2012 |
| WO | 2005041018 A1 | 5/2005 |

OTHER PUBLICATIONS

International Search Report and Written Opinion—PCT/US2012/047059—ISA/EPO—Oct. 4, 2012.

* cited by examiner

Shake in X Direction

Shake in X Direction

Shake in X Direction

SENSOR-BASED USER INTERFACE CONTROL

CROSS REFERENCE TO RELATED APPLICATIONS

This application is a continuation of U.S. non-provisional application Ser. No. 13/242,620, "Sensor-based User Interface Control" filed Sep. 23, 2011, which claims the benefit of U.S. provisional application No. 61/515,263, "Sensor-based Dexterity Determination" filed Aug. 4, 2011. The aforementioned United States applications are hereby incorporated by reference in their entirety.

FIELD

The present disclosure relates to the field of wireless communications. In particular, the present disclosure relates to sensor-based user interface control for a mobile device.

BACKGROUND

Various products have been designed for use specifically for left-handed users or right-handed users. For example, there are computer keyboards and mice designed specifically for left-handed or right-handed users. One of the drawbacks of these conventional products is that they are intended to be used by only left-handed or right-handed users. As a result, the manufacturers, distributors, and retailers are required to stock extra products to satisfy the demand from both left-handed and right-handed users, which in turn increases the cost of these products. Many conventional handheld devices, such as cellular phones and personal digital assistances (PDAs), are intended to be used by both the left hand and the right hand of a user. However, these conventional devices do not have the capability to determine whether it is the left hand or the right hand operating the devices, and do not provide the capability to configure the device based on such a determination that the left hand or the right hand is operating the device. Thus, usability and user experience of these conventional handheld devices can be adversely impacted.

Therefore, there is a need for sensor-based user interface control of a mobile device that can address the above issues of conventional products.

SUMMARY

The present disclosure relates to sensor-based user interface control for a mobile device. In one embodiment, a method for determining a characteristic of handedness includes sensing a rotation of a mobile device, determining a direction of rotation based at least in part on accessing information indicative of a first position state prior to sensing the rotation and accessing information indicative of a second position state subsequent to sensing the rotation, and determining the characteristic of handedness based at least in part on the direction of rotation, the first position state, and the second position state. The characteristic of handedness includes one of a left handedness or right handedness. The method further includes determining a user interface mode based on the characteristic of handedness determined, and controlling the mobile device in accordance with the user interface mode determined.

The method of determining the characteristics of handedness includes: identifying a left-hand operation by the user according to an initial position of facing-down and a final position of facing-up as a result of a counterclockwise rotation; identifying a left-hand operation by the user according to an initial position of facing-up and a final position of facing-down as a result of a clockwise rotation; identifying a right-hand operation by the user according to an initial position of facing-down and a final position of facing-up as a result of a clockwise rotation; and identifying a right-hand operation by the user according to an initial position of facing-up and a final position of facing-down as a result of a counter-clockwise rotation.

The method of controlling the mobile device can use a shake to implement user commands, such as Next or Previous command, for some applications. The method includes setting a first threshold value for a shake in a positive direction of a first axis, setting a second threshold value for a shake in a negative direction of the first axis, sensing a first valid shake of the mobile device in accordance with the first threshold value and the second threshold value, and generating a first command using the first valid shake to control the mobile device.

In another embodiment, the method of controlling the mobile device can use a shake to implement for example Up or Down command, for some applications. The method includes setting a third threshold value for a shake in a positive direction of a second axis, setting a fourth threshold value for a shake in a negative direction of the second axis, sensing a second valid shake of the mobile device in accordance with the third threshold value and the fourth threshold value, and generating a second command using the second valid shake to control the mobile device.

In yet another embodiment, the method of controlling the mobile device can use a shake to implement for example In or Out command, for some applications. The method includes setting a fifth threshold value for a shake in a positive direction of a third axis, setting a sixth threshold value for a shake in a negative direction of the third axis, sensing a third valid shake of the mobile device in accordance with the fifth threshold value and the sixth threshold value, and generating a third command using the third valid shake to control the mobile device.

In yet another embodiment, the method of controlling the mobile device includes setting a seventh threshold value for an angle of motion in a clockwise direction relative to the user, setting a eighth threshold value for the angle of motion in a counterclockwise direction relative to the user, sensing a valid flip of the mobile device in accordance with the seventh threshold value and the eighth threshold value, and generating a fourth command using the valid flip to control the mobile device. In yet another embodiment, the method also includes setting a ninth threshold value for a range of motion in a clockwise direction relative to the user, setting a tenth threshold value for the range of motion in a counterclockwise direction relative to the user, sensing a valid flip of the mobile device in accordance with the ninth threshold value and the tenth threshold value, and generating a fifth command using the valid flip to control the mobile device.

According to embodiments of the present disclosure, the method can be applied to determine whether the user is right-handed or left-handed. It includes storing an operation history of the user over a period of time, determining whether the user is right-handed or left-handed using the operation history, and controlling the mobile device according to whether the user is right-handed or left-handed. The method can also be useful in other applications. For example, the method can include sensing trajectory, speed and accuracy of a swing of the mobile device by the user, analyzing the swing of the mobile device by the user, and displaying the swing and analysis data on a display device, where the swing can be an emulated golf swing or tennis swing. For another example, the method can include setting a sequence of handshakes of the mobile device, sensing a valid sequence of handshakes, and granting permission to use the mobile device in accordance with the valid sequence of handshakes.

In another embodiment, a mobile device includes one or more sensors configured to sense a first position state, a second position state, and a corresponding direction of rotation of a mobile device, a processor configured to control operations of the mobile device, and a sensor-based user interface control module configured to control user interface of the mobile device. The sensor-based user interface control module includes logic for sensing a rotation of a mobile device, logic for determining a direction of rotation based at least in part on logic for accessing information indicative of a first position state prior to sensing the rotation and logic for accessing information indicative of a second position state subsequent to sensing the rotation, and logic for determining the characteristic of handedness based at least in part on the direction of rotation, the first position state, and the second position state.

In yet another embodiment, a computer program product for determining a characteristic of handedness includes a non-transitory medium storing computer programs for execution by one or more computer systems. The computer program product includes code for sensing a rotation of a mobile device, code for determining a direction of rotation based at least in part on code for accessing information indicative of a first position state prior to sensing the rotation, and code for accessing information indicative of a second position state subsequent to sensing the rotation, and code for determining the characteristic of handedness based at least in part on the direction of rotation, the first position state, and the second position state. The computer program product further includes code for determining a user interface mode based on the characteristic of handedness determined, and code for controlling the mobile device in accordance with the user interface mode determined.

BRIEF DESCRIPTION OF THE DRAWINGS

The aforementioned features and advantages of the disclosure, as well as additional features and advantages thereof, will be more clearly understandable after reading detailed descriptions of embodiments of the disclosure in conjunction with the following drawings.

Like numbers are used throughout the figures.

DESCRIPTION OF EMBODIMENTS

Embodiments of sensor-based user interface control for a mobile device are disclosed. The following descriptions are presented to enable any person skilled in the art to make and use the disclosure. Descriptions of specific embodiments and applications are provided only as examples. Various modifications and combinations of the examples described herein will be readily apparent to those skilled in the art, and the general principles defined herein may be applied to other examples and applications without departing from the spirit and scope of the disclosure. Thus, the present disclosure is not intended to be limited to the examples described and shown, but is to be accorded the widest scope consistent with the principles and features disclosed herein.

According to embodiments of the present disclosure, a characteristic of handedness includes one of left handedness or right handedness. In view of operating a mobile device, there may be a left-hand operation, a right-hand operation, an operation by both hands, and no operation. In addition, the term handedness does not carry the meaning of a preference or tendency of using one hand than the other hand according to embodiments of the present disclosure. A left-hand operation means an operation by the left hand, which is also referred to as a left-handed operation. Similarly, a right-hand operation means an operation by the right hand, which is also referred to as a right-handed operation. A mobile device is also referred to as a handheld device according to embodiments of the present disclosure.

Figure 1A:
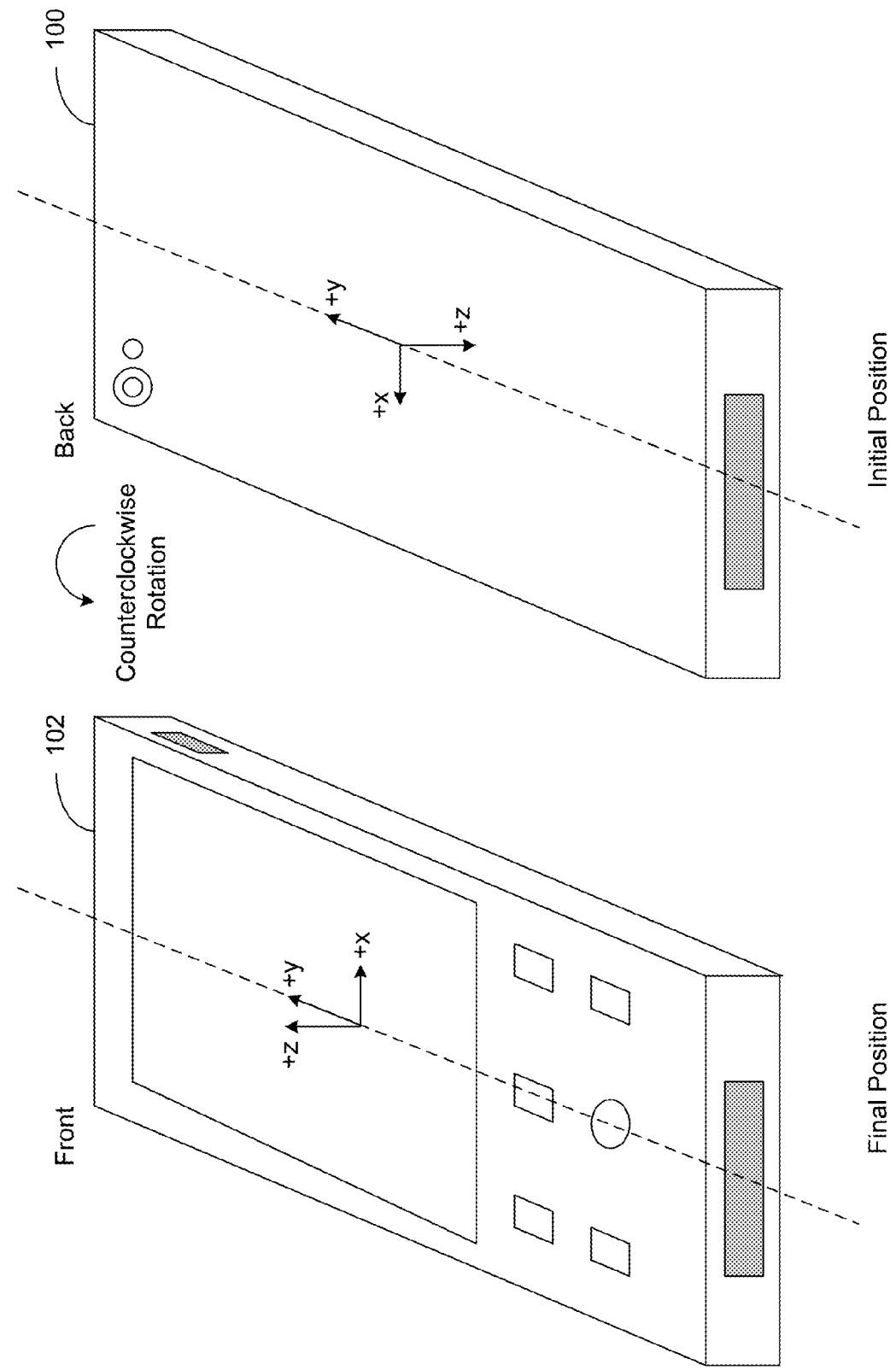
FIG. 1a and FIG. 1b illustrate left-handed operations of a handheld device according to some aspects of the present disclosure.
Figure 1B:
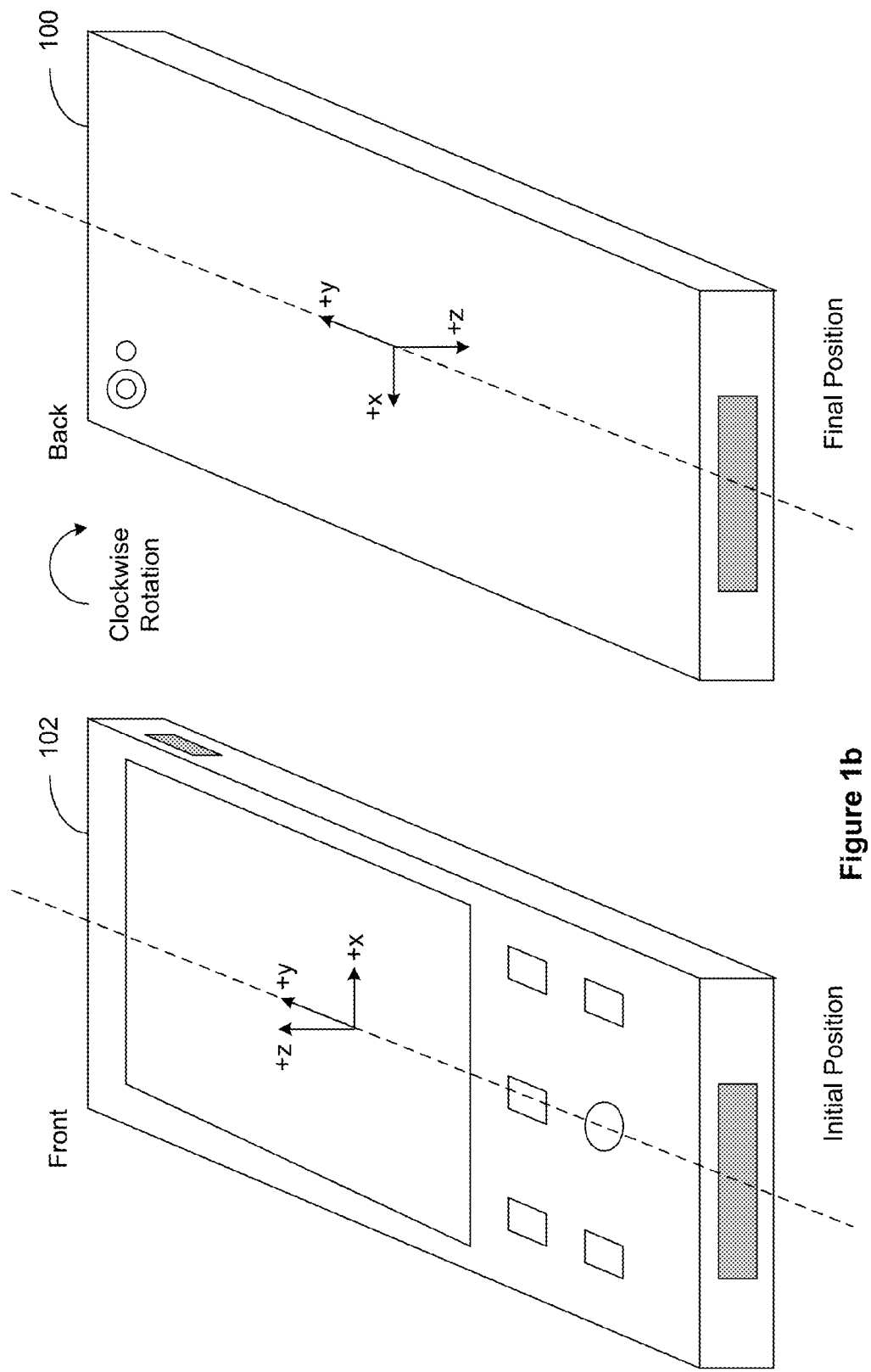

FIG. 1a and FIG. 1b illustrate left-handed operations of a handheld device according to some aspects of the present disclosure. As shown in FIG. 1a, a handheld device (also referred to as a mobile device or device for short) is rotated in a counterclockwise direction from a facing down position (back of the device) to a facing up position (front of the device). In this example, the facing down position 100 is an initial position, which is also referred to as a first position state, of the handheld device, and the facing up position 102 is a final position, which is also referred to as a second position state, of the handheld device after the rotation. This change in positions of the handheld device can represent a scenario of a left hand that picks up the handheld device from its initial position of facing down 100, rotates the handheld device in a counterclockwise direction to reach its final position of facing up 102. From this change in positions of the handheld device, the direction and angle of rotation, it can be determined that the handheld device would be operated by the left hand of the user.

Similarly in FIG. 1b, the handheld device is rotated in a clockwise direction from a facing up position (front of the device) to a facing down position (back of the device). As shown in FIG. 1b, the facing up position 102 is the initial position of the handheld device, and the facing down position 100 is the final position of the handheld device after the rotation. This change in positions of the handheld device can represent a scenario of a left hand that puts down the handheld device from its initial position of facing up 102, rotates the handheld device in a clockwise direction to reach its final position of facing down 100. Thus, from this change in positions of the handheld device, the direction and angle of rotation, it can be determined that the handheld device would be operated by the left hand of the user.

In FIG. 1*a* and FIG. 1*b*, relative orientations of handheld device are shown. In one example, the handheld device can be on a surface (such as a desk) parallel to the floor, in the facing up position 102, the x-axis and the y-axis define the surface the handheld device is being held or placed, and the z-axis defines third axis that is away from the surface. In the facing down position 100, the x and z orientations of the handheld device have been rotated approximately 180 degrees from the facing up position 102, and the y orientation of the handheld device remains approximately the same. Note that the x, y, and z orientations of the handheld device are relative to the user and they are not necessarily absolute with respect to a particular plane or surface. Instead, these are approximate orientations with respect to the user. For example, when the handheld device is placed on a desk in the facing down position 100, the surface of the desk can be approximately parallel to the plane of the floor, which may have an angle of deviation of 0 to 15 degrees. Similarly, when the handheld device is being held by the user in the facing up position 102, the plane of the handheld device being held can be approximately parallel to the plane of the floor, which may have an angle of deviation of 0 to 45 degrees.

Various types of sensors, including but not limited to, accelerometer, gyroscope, and magnetometer may be used to detect motions and rotations of the handheld device. The accelerometer may perform better in detecting linear movements, the gyroscope may perform better in detecting rotations, and the magnetometer may perform better in detecting orientations of the handheld device. A combination of two or more such sensors may be used to detect movement, rotation, and orientation of the handheld device according to aspects of the present disclosure.

According to embodiments of the present disclosure, an accelerometer is a device that measures the acceleration of the handheld device. It measures the acceleration associated with the weight experienced by a test mass that resides in the frame of reference of the accelerometer. For example, an accelerometer measures a value even if it is stationary, because masses have weights, even though there is no change of velocity. The accelerometer measures weight per unit of mass, a quantity also known as gravitational force or g-force. In other words, by measuring weight, an accelerometer measures the acceleration of the free-fall reference frame (inertial reference frame) relative to itself. In one approach, a multi-axis accelerometer can be used to detect magnitude and direction of the proper acceleration (or g-force), as a vector quantity. In addition, the multi-axis accelerometer can be used to sense orientation as the direction of weight changes, coordinate acceleration as it produces g-force or a change in g-force, vibration, and shock. In another approach, a micro-machined accelerometer can be used to detect position, movement, and orientation of the handheld device.

According to embodiments of the present disclosure, a gyroscope is used to measure rotation and orientation of the handheld device, based on the principles of conservation of angular momentum. The accelerometer or magnetometer can be used to establish an initial reference for the gyroscope. After the initial reference is established, the gyroscope can be more accurate than the accelerometer or magnetometer in detecting rotation of the handheld device because it is less impacted by vibrations, or by the electromagnet fields generated by electrical appliances around the handheld device. A mechanical gyroscope can be a spinning wheel or disk whose axle is free to take any orientation. This orientation changes much less in response to a given external torque than it would without the large angular momentum associated with the gyroscope's high rate of spin. Since external torque is minimized by mounting the device in gimbals, its orientation remains nearly fixed, regardless of any motion of the platform on which it is mounted. In other approaches, gyroscopes based on other operating principles may also be used, such as the electronic, microchip-packaged Micro-electromechanical systems (MEMS) gyroscope devices, solid state ring lasers, fiber optic gyroscopes and quantum gyroscope.

According to embodiments of the present disclosure, a magnetometer can be used to measure orientations by detecting the strength or direction of magnetic fields around the handheld device. Various types of magnetometers may be used. For example, a scalar magnetometer measures the total strength of the magnetic field it is subjected to, and a vector magnetometer measures the component of the magnetic field in a particular direction, relative to the spatial orientation of the handheld device. In another approach, a solid-state Hall-effect magnetometer can be used. The Hall-effect magnetometer produces a voltage proportional to the applied magnetic field, and it can be configured to sense polarity.

Figure 2A:
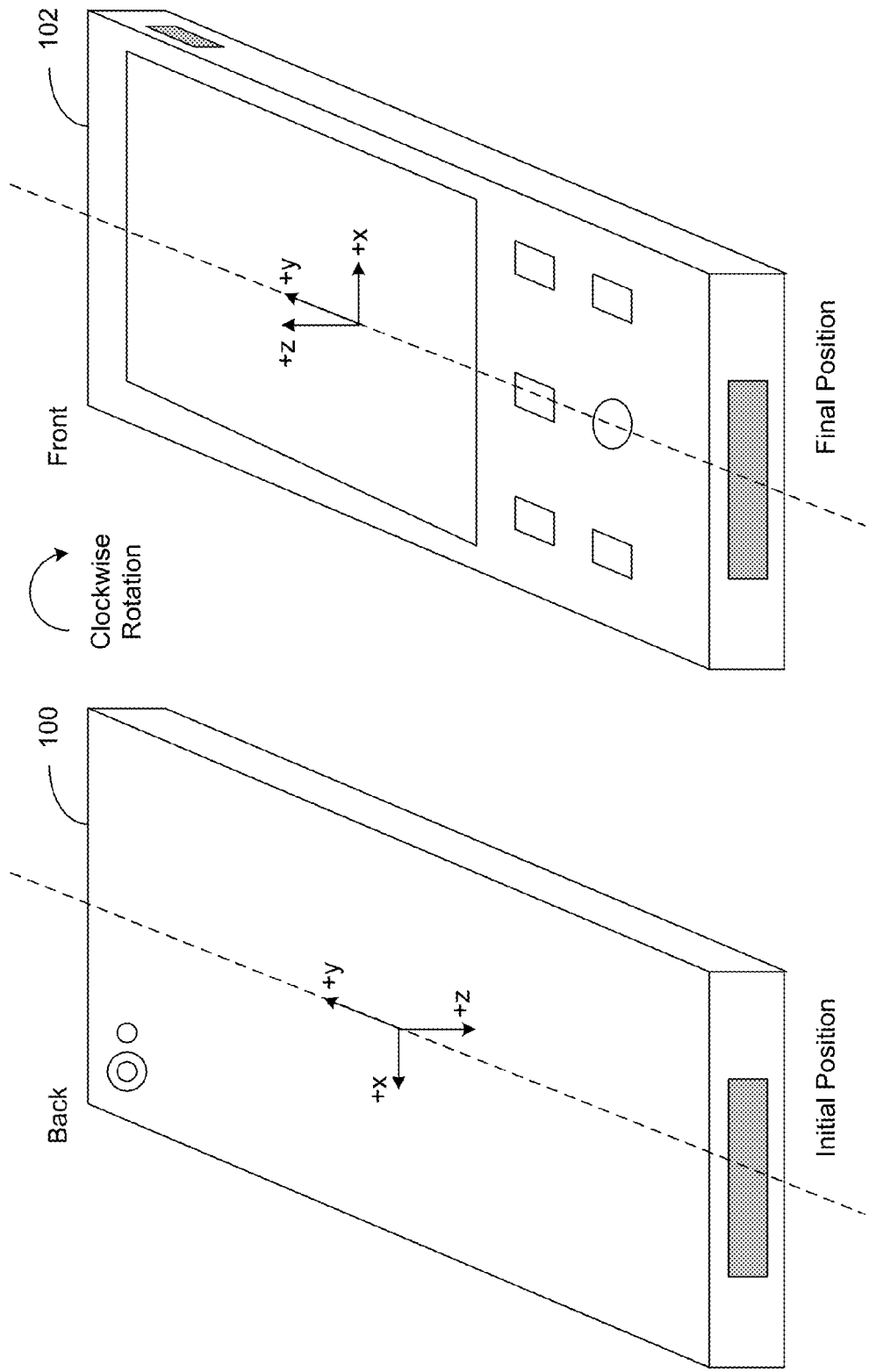
FIG. 2a and FIG. 2b illustrate right-handed operations of a handheld device according to some aspects of the present disclosure.
Figure 2B:
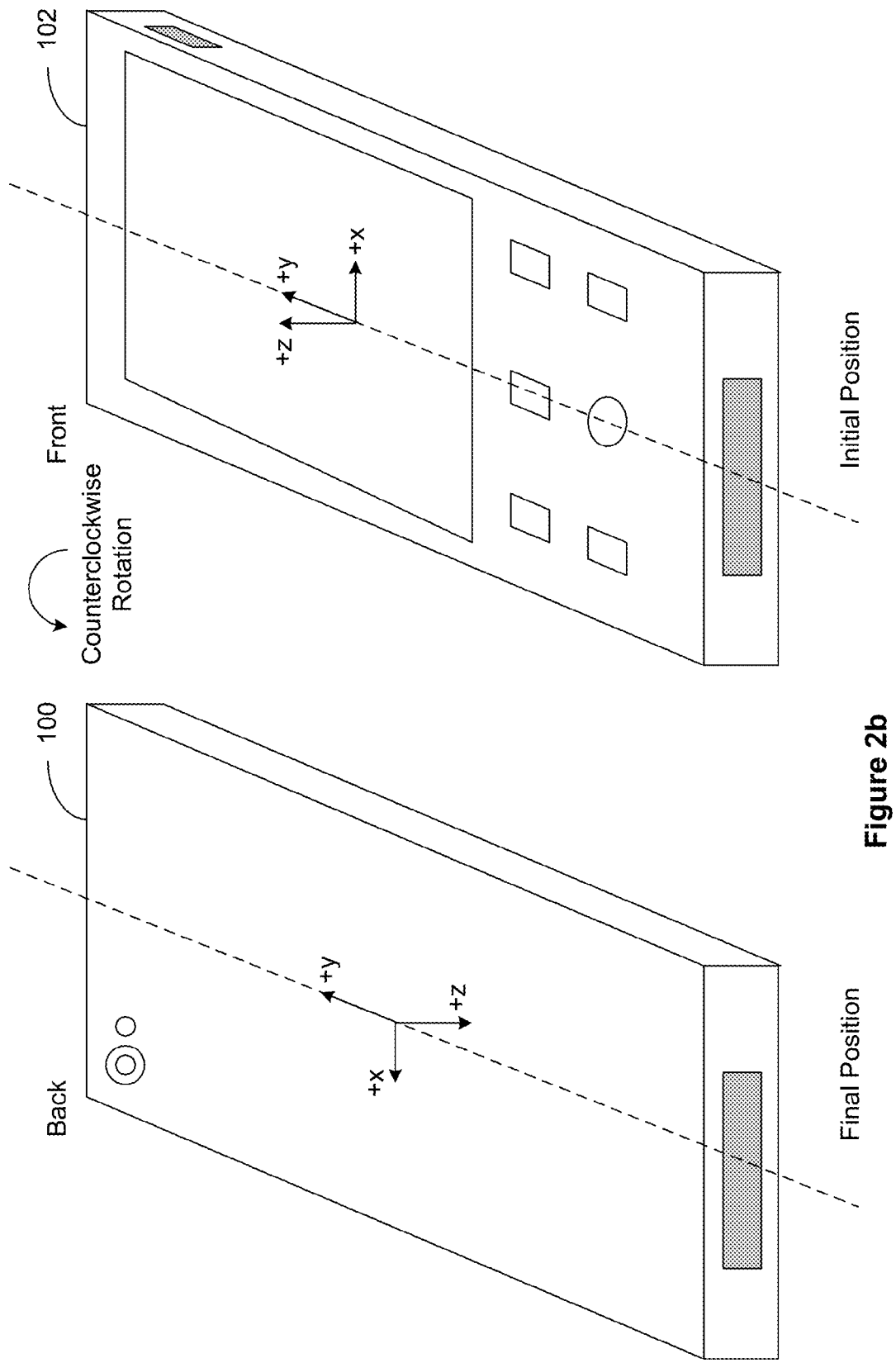

FIG. 2*a* and FIG. 2*b* illustrate right-handed operations of a handheld device according to some aspects of the present disclosure. In the example shown in FIG. 2*a*, the handheld device is rotated in a clockwise direction from a facing down position 100 (back of the device) to a facing up position (front of the device). The facing down position 100 is the initial position, which is also referred to as the first position state, of the handheld device, and the facing up position 102 is the final position, which is also referred to as the second position state, of the handheld device after a clockwise rotation. This change in positions of the handheld device can represent a scenario of a right hand that picks up the handheld device from its initial position of facing down 100, rotates the handheld device in a clockwise direction to reach its final position of facing up 102. Thus, from this change in positions of the handheld device, the direction and angle of rotation, it can be determined that the handheld device would be operated by the right hand of the user.

Similarly in FIG. 2*b*, the handheld device is rotated in a counterclockwise direction from a facing up position 102 (front of the device) to a facing down position 100 (back of the device). As shown in FIG. 2*b*, the facing up position 102 is an initial position of the handheld device, and the facing down position 100 is a final position of the handheld device after the counterclockwise rotation. This change in positions of the handheld device can represent a scenario of a right hand that puts down the handheld device from its initial position of facing up 102, rotates the handheld device in a counterclockwise direction to reach its final position of facing down 100. From this change in positions of the handheld device, the direction and angle of rotation, it can be determined that the handheld device would be operated by the right hand of the user.

According to embodiments of the present disclosure, high resolution touch screen may be used to determine left-handed or right-handed operation of a handheld device. With a high resolution touch screen, the handheld device may be configured to sense where the screen is being touched, and read the fingerprint to determine which finger touches the screen. In addition, the handheld device may be configured to detect the angle of the touch to determine whether it is the right hand or left hand that is interacting with the handheld device. For example, if a thumb comes from right side of the device, the device is likely to be operated by the right hand of the user;

similarly if a thumb comes from left side of the device, the device is likely to be operated by the left hand of the user.

In yet another approach, the handheld device may include pressure sensors to determine whether a right hand or a left hand is holding the device. For example, the pressure sensors may be configured to detect a thumb on the right side and four fingers on the left side, and therefore the device is held with a right hand. Similarly, if there is a thumb on the left side and four fingers are on the right side of the device, then the device is held with a left hand.

Figure 3A:
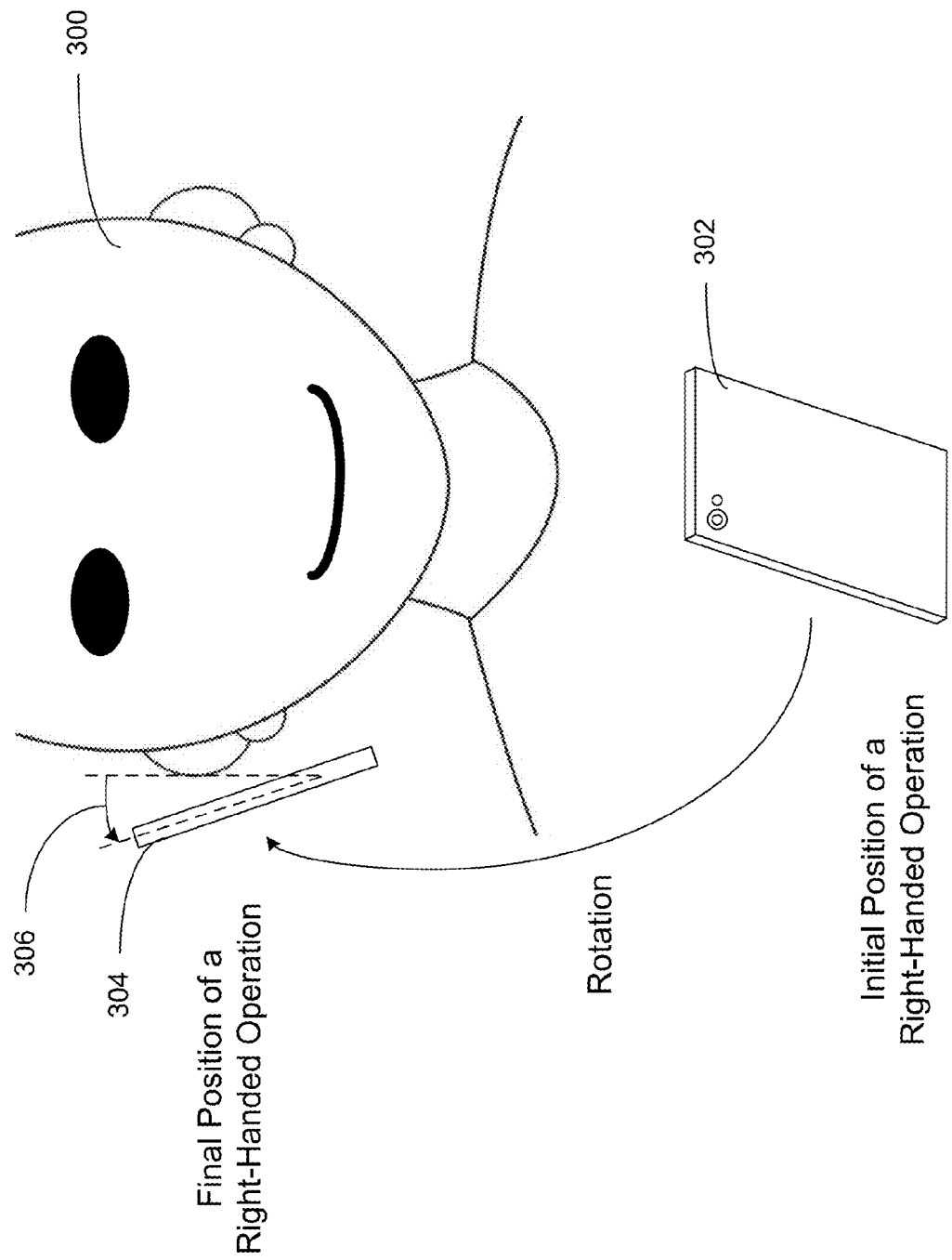
FIG. 3a illustrates another right-handed operation of a handheld device according to some aspects of the present disclosure.

FIG. 3a illustrates another right-handed operation of a handheld device according to some aspects of the present disclosure. In the exemplary FIG. 3a, the handheld device is moved by user 300 from a facing up position 302 to near the right ear of the user. The facing up position 302 is the initial position, which is also referred to as the first position state, of the handheld device, and near the right ear 304 is the final position, which is also referred to as the second position state, of the handheld device after a clockwise rotation. This change in positions of the handheld device can represent a scenario of a right hand that picks up and answers a phone call. In this case, the right hand of the user picks up the handheld device from its initial position 302, rotates the handheld device in a clockwise direction to reach its final position near right side of the user's face 304. Angle 306 represents an expected angle of tilt when a right hand is holding the handheld device, which can be associated with the initial position and final position of a right-handed operation. Thus, from this change in positions of the handheld device, the direction and angle of rotation, it can be determined that the handheld device would be operated by the right hand of the user. Together with the initial position, the final position, and the direction of rotation, the expected angle of tilt 306 can be used to confirm the right-handed operation of the handheld device.

Figure 3B:
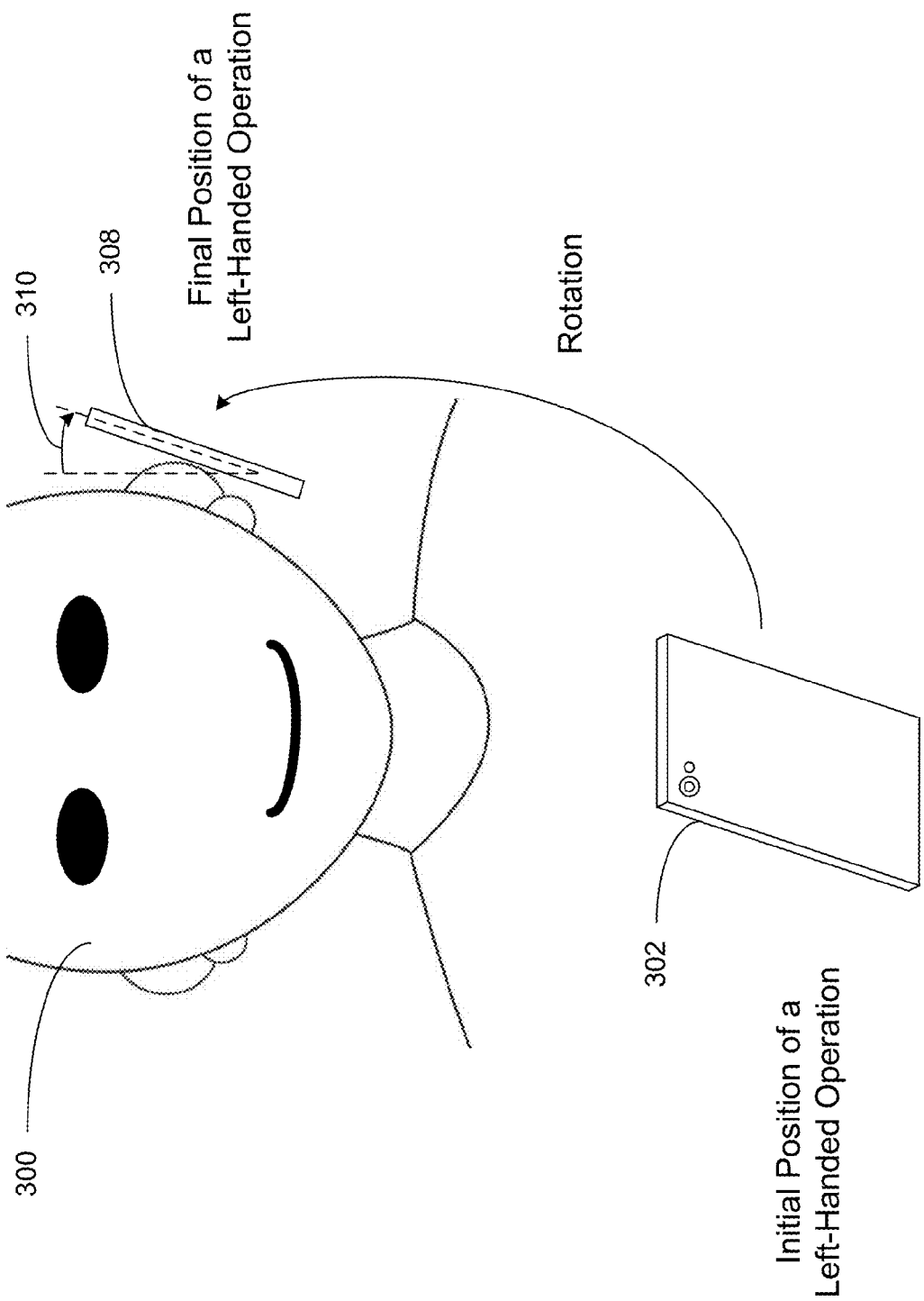
FIG. 3b illustrates another left-handed operation of a handheld device according to some aspects of the present disclosure.

FIG. 3b illustrates another left-handed operation of a handheld device according to some aspects of the present disclosure. As shown in FIG. 3b, the handheld device is moved by user 300 from a facing up position 302 to near the left ear of the user. The facing up position 302 is the initial position of the handheld device, and near the left ear 308 is the final position of the handheld device after a counterclockwise rotation. This change in positions of the handheld device can represent a scenario of a left hand that picks up and answers a phone call. In this case, the left hand of the user picks up the handheld device from its initial position 302, rotates the handheld device in a counterclockwise direction to reach its final position near left side of the user's face 308. Angle 310 represents an expected angle of tilt when a left hand is holding the handheld device, which can be associated with the initial position and final position of a left-handed operation. Thus, from this change in positions of the handheld device, the direction and angle of rotation, it can be determined that the handheld device would be operated by the left hand of the user. Together with the initial position, the final position, and the direction of rotation, the expected angle of tilt 310 can be used to confirm the left-handed operation of the handheld device.

In the examples of FIG. 3a and FIG. 3b, the handheld device may include proximity sensors such as infrared light emitting diodes (LEDs) that detect if the device is close to the user's face. The available infrared LED light sensors may be employed to sense shadows of the thumb and fingers on the screen and use the information to determine which hand is holding the device. For example, when the infrared LEDs detects a cellular phone is close to the user's face (in situation when user is making a phone call) and determines which hand is operating the phone, the cellular phone may be configured to have its touch screen buttons placed for the ease-of-use of the hand that operates the phone. For example, the touch screen can be controlled to have more control buttons within reach of the thumb of the hand operating the phone. In addition, upon detecting the cellular phone is within close proximity to the user's face, it can be configured to automatically turn off the display to save power while the user is talking on the phone. Another benefit of automatically turning off the screen is that other buttons in the touch screen would not be accidentally touched by the user's ear or cheek and such erroneous touch may cause the phone to perform other unintended functions.

After determining which hand of the user operates the handheld device, the touch screen control of the handheld device may be configured to work with either the left hand or the right hand. For example, if it is determined that the handheld device is operated by the right hand, more touch screen control buttons may be provided within reach of the thumb of the right hand; likewise, if it is determined that the handheld device is operated by the left hand, more touch screen control buttons may be provided within reach of the thumb of the left hand.

Note that the user operation history described in FIGS. 1a-1b, 2a-2b, and 3a-3b may be recorded and collected over a period time. Using the user operation history, it can be determined that whether the user is right-handed or left-handed. And the handheld device may be controlled according to whether the user is right-handed or left-handed.

In the following examples from FIGS. 4 to 6, the x, y, and z axes are used to define the three dimensional space the handheld device is in. They are not necessarily tied to any particular fixed orientation. Typically, the plane defined by the x and y axes provides a convenient viewing angle of the screen to the user, which depends on position of the user holding the device. For example, the plane defined by the x and y axes would be different when the user is viewing the device in a stand-up position versus in a lying-down position. The z axis may define a direction that user views the screen of the handheld device. In addition, there are other means to define a three dimensional space, and the label of the x, y, and z axes may be chosen in another order.

Figure 4C:
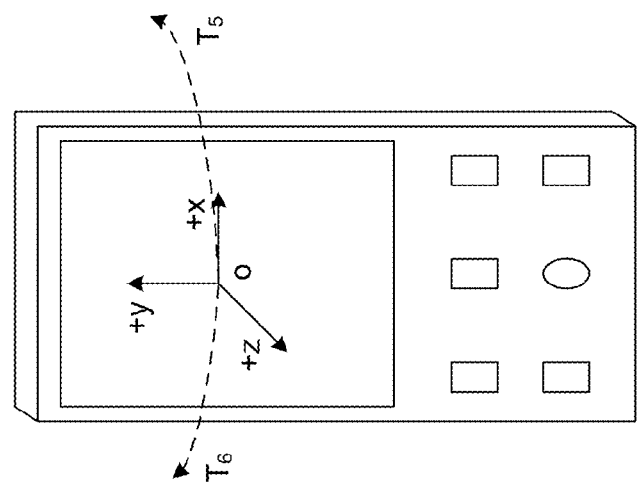
FIGS. 4a-4c illustrate shaking of a handheld device in the x-direction as user commands according to some aspects of the present disclosure.
Figure 4B:
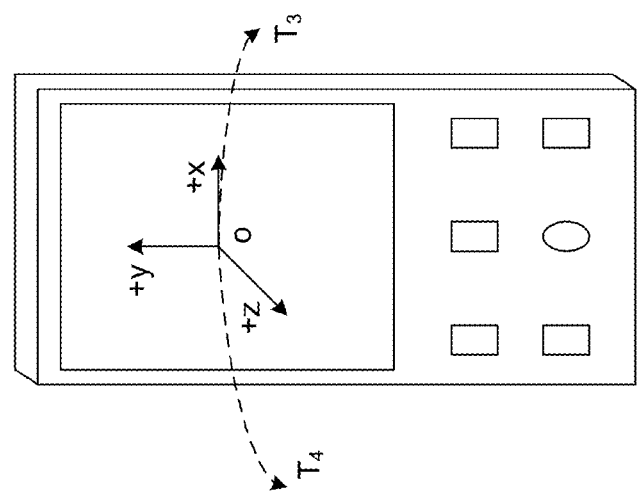
Figure 4A:
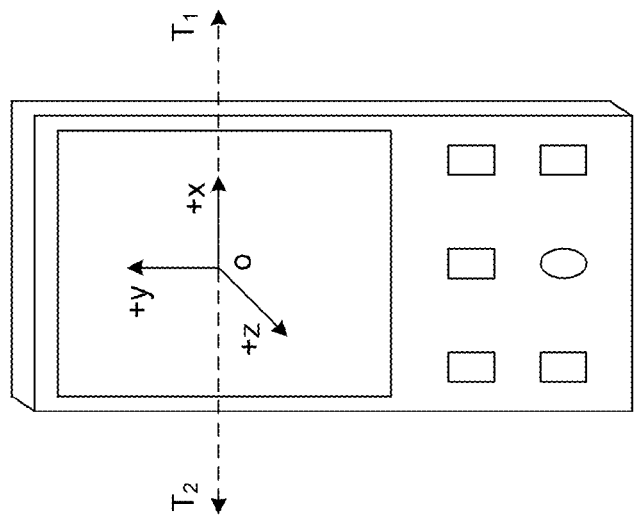

FIGS. 4a-4c illustrate shaking of a handheld device in the x-direction as user commands according to some aspects of the present disclosure. Referring to FIG. 4a, it illustrates a method of implementing a user command through shaking of the handheld device as a user motion gesture along a first axis, in this example the x axis. According to embodiments of the present disclosure, the handheld device can be configured to detect a shake along the x axis by the user to implement a control command such as go to the NEXT page/song or go to the PREVIOUS page/song. The user command includes a shake motion in a direction indicated by an arrow (not shown) on the screen of the handheld device, and a return motion back to the initial position prior to the shake motion. For example, the command to the NEXT page/song can include a shake motion starts at/near point O (origin of the three dimensional coordinate system) along +x direction along $T_1$, and a return motion back to/near point O. Similarly, the command to the PREVIOUS page/song can include a shake motion starts at/near point O along −x direction along $T_2$, and a return motion back to/near point O. The speed of the going out motion from point O is faster than the speed of the returning motion back to point O.

To sense a valid user command, a first threshold value can be set for a shake in the +x axis, and a second threshold value can be set for a shake in the −x axis. The first and second threshold values can be predetermined acceleration values in the +x and −x axes (such as between 1.5 g to 2.5 g and between 1 g to 1.5 g, where g is the gravitational acceleration) respectively. For example, for a right-handed operation, the threshold acceleration value to the left (along −x axis) may be higher than the threshold acceleration value to the right (along the +x axis). On the contrary, for a left-handed operation, the threshold acceleration value to the right (along +x axis) may be higher than the threshold acceleration value to the left (along the −x axis). Preset threshold acceleration values may be used as default, and the threshold acceleration values may also be set by the user depending on the user's preference. For example, an adult user may have a stronger shaking motion than that of a child user.

Referring to FIG. 4b, it illustrates another method of implementing a user command through shaking of the handheld device along the x axis for a right-handed operation. In this exemplary embodiment, the method takes into consideration the range of motion and the angle of motion of a right-handed operation. Note that the shaking motion is no longer along approximately a straight line as in the example described in FIG. 4a. Instead, the shaking motion can be shown approximately as an arc along $T_3$ and $T_4$, which represents the motion of rotating the wrist, elbow, and/or the shoulder in generating the shaking motion. In this approach, threshold values can be set for angles of motion such as greater than 30 degrees relative to the x axis. In another approach, threshold values can be set for ranges of motion relative to point O. For example, for a right-handed operation, the range to the left (for example 2 inches along $T_4$) may be larger than the range to the right (for example 1 inch along $T_3$).

Referring to FIG. 4c, it illustrates yet another method of implementing a user command through shaking of the handheld device along the x axis for a left-handed operation. In this exemplary embodiment, the method takes into consideration the range of motion and the angle of motion of a left-handed operation. Note that the shaking motion is no longer along approximately a straight line as in the example described in FIG. 4a. Instead, the shaking motion can be shown approximately as an arc along $T_5$ and $T_6$, which represents the motion of rotating the wrist, elbow, and/or the shoulder in generating the shaking motion. In this approach, threshold values can be set for angles of motion such as greater than 30 degrees relative to the x axis. In another approach, threshold values can be set for ranges of motion relative to point O. For example, for a left-handed operation, the range to the right (for example 2 inches along $T_5$) may be larger than the range to the left (for example 1 inch along $T_6$).

Note that in the examples shown in FIGS. 4a-4c, the range of motion and angle of motion of a right-handed operation flipping to the left is greater than the range of motion and angle of motion of the same right-handed operation flipping to the right. Similarly, the speed of motion can be different for a right-handed operation versus a left-handed operation. For example, a right-handed operation flipping to the left can be faster than a left-handed operation flipping to the left, and vice versa.

Figure 5C:
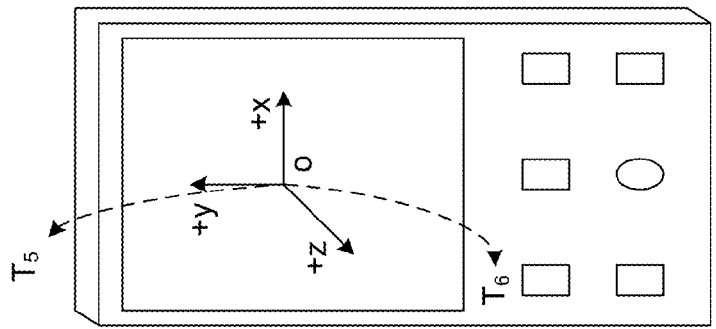
FIGS. 5a-5c illustrate shaking of a handheld device in the y-direction as user commands according to some aspects of the present disclosure.
Figure 5B:
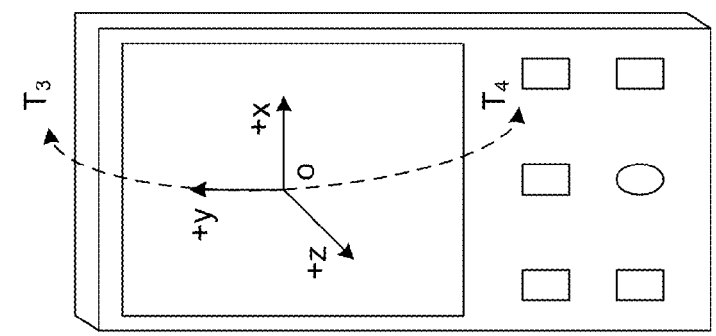
Figure 5A:
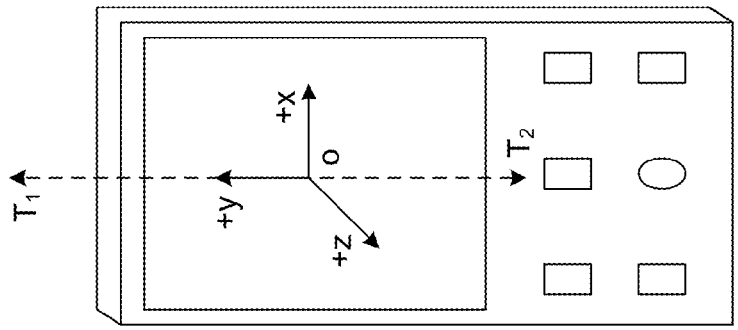

FIGS. 5a-5c illustrate shaking of a handheld device in the y-direction as user commands according to some aspects of the present disclosure. According to embodiments of the present disclosure, the handheld device can be configured to detect a shaking motion along the y axis to implement a UP command and a DOWN command for certain games or other applications.

Referring to FIG. 5a, to sense a valid user command, a third threshold value can be set for a shake in the +y axis, and a fourth threshold value can be set for a shake in the −y axis. The third and fourth threshold values can be predetermined acceleration values in the +y and −y axes (such as between 1.5 g to 2.5 g and between 1 g to 1.5 g, where g is the gravitational acceleration) respectively. Preset threshold acceleration values may be used as default, and the threshold acceleration values may also be set by the user depending on the user's preference. For example, an adult user may have a stronger shaking motion than that of a child user. For instance, the UP command can include a shake motion starts at/near point O along +y direction along $T_1$, and a return motion back to/near point O. Similarly, the DOWN command can include a shake motion starts at/near point O along −y direction along $T_2$, and a return motion back to/near point O. The speed of the going out motion from point O is faster than the speed of the returning motion back to point O.

Referring to FIG. 5b, it illustrates another method of implementing user commands through shaking of the handheld device along the y axis for a right-handed operation. In this exemplary embodiment, the method takes into consideration the range of motion and the angle of motion of a right-handed operation. Note that the shaking motion is no longer along approximately a straight line as in the example described in FIG. 5a. Instead, the shaking motion can be shown approximately as an arc along $T_3$ and $T_4$, which represents the motion of rotating the wrist, elbow, and/or the shoulder in generating the shaking motion. In this approach, threshold values can be set for angles of motion such as greater than 30 degrees relative to the y axis. In another approach, threshold values can be set for ranges of motion relative to point O. For a right-handed operation for example, the range to the UP direction (for example 2 inches along $T_3$) may be larger than the range to the DOWN direction (for example 1 inch along $T_4$).

Referring to FIG. 5c, it illustrates yet another method of implementing user commands through shaking of the handheld device along the y axis for a left-handed operation. In this exemplary embodiment, the method takes into consideration the range of motion and the angle of motion of a left-handed operation. Note that the shaking motion is no longer along approximately a straight line as in the example described in FIG. 5a. Instead, the shaking motion can be shown approximately as an arc along $T_5$ and $T_6$, which represents the motion of rotating the wrist, elbow, and/or the shoulder in generating the shaking motion. In this approach, threshold values can be set for angles of motion such as greater than 30 degrees relative to the y axis. In another approach, threshold values can be set for ranges of motion relative to point O. For example, for a left-handed operation, the range to the up direction (for example 2 inches along $T_5$) may be larger than the range to the down direction (for example 1 inch along $T_6$).

Figure 6C:
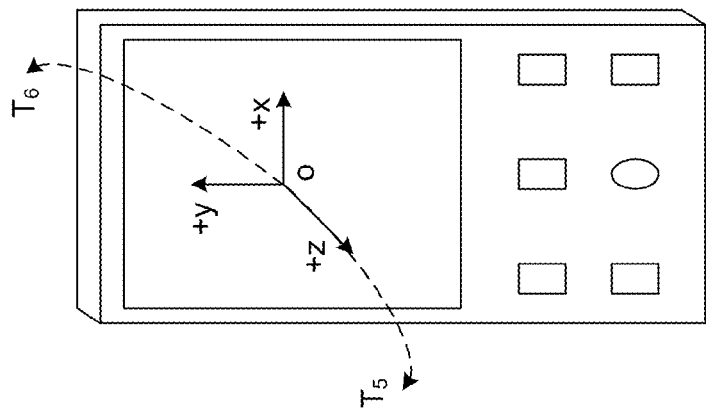
FIGS. 6a-6c illustrate shaking of a handheld device in the z-direction as user commands according to some aspects of the present disclosure.
Figure 6B:
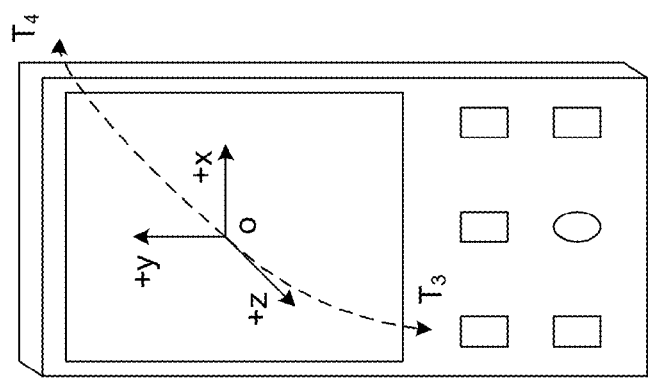
Figure 6A:
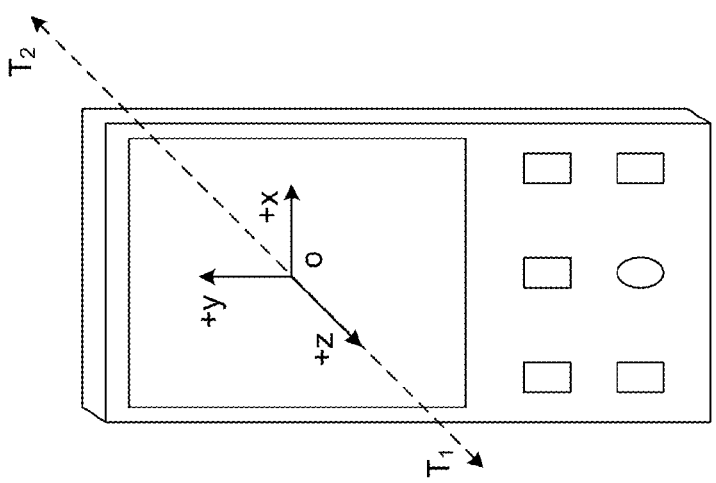

FIGS. 6a-6c illustrate shaking of a handheld device in the z-direction as user commands according to some aspects of the present disclosure. According to embodiments of the present disclosure, the handheld device can be configured to detect a shaking motion along the z axis to implement an IN command and an OUT command for certain games or other applications. Note that the IN command may be referred to as the PUSH command and the OUT command may be referred to as the PULL command in some applications.

Referring to FIG. 6a, to sense a valid user command, a fifth threshold value can be set for a shake in the +z axis, and a sixth threshold value can be set for a shake in the −z axis. The fifth and sixth threshold values can be predetermined acceleration values in the +z and −z axes (such as between 1.5 g to 2.5 g and between 1 g to 1.5 g, where g is the gravitational acceleration) respectively. Preset threshold acceleration values may be used as default, and the threshold acceleration values may also be set by the user depending on the user's preference. For example, the IN (or PUSH) command can include a shake motion starts at/near point O along +z direction along $T_1$, and a return motion back to/near point O. Similarly, the OUT (or PULL) command can include a shake motion starts at/near point O along –z direction along $T_2$, and a return motion back to/near point O. The speed of the going away motion from point O is faster than the speed of the returning motion back to point O.

Referring to FIG. 6b, it illustrates another method of implementing user commands through shaking of the handheld device along the z axis for a right-handed operation. In this exemplary embodiment, the method takes into consideration the range of motion and the angle of motion of a right-handed operation. Note that the shaking motion is no longer along approximately a straight line as in the example described in FIG. 6a. Instead, the shaking motion can be shown approximately as an arc along $T_3$ and $T_4$, which represents the motion of rotating the wrist, elbow, and/or the shoulder in generating the shaking motion. In this approach, threshold values can be set for angles of motion such as greater than 30 degrees relative to the z axis. In another approach, threshold values can be set for ranges of motion relative to point O. For a right-handed operation for example, the range to the IN (or PUSH) direction (for example 2 inches along $T_3$) may be larger than the range to the OUT (or PULL) direction (for example 1 inch along $T_4$).

Referring to FIG. 6c, it illustrates yet another method of implementing user commands through shaking of the handheld device along the z axis for a left-handed operation. In this exemplary embodiment, the method takes into consideration the range of motion and the angle of motion of a left-handed operation. Note that the shaking motion is no longer along approximately a straight line as in the example described in FIG. 6a. Instead, the shaking motion can be shown approximately as an arc along $T_5$ and $T_6$, which represents the motion of rotating the wrist, elbow, and/or the shoulder in generating the shaking motion. In this approach, threshold values can be set for angles of motion such as greater than 30 degrees relative to the z axis. In another approach, threshold values can be set for ranges of motion relative to point O. For example, for a left-handed operation, the range to the IN (or PUSH) direction (for example 2 inches along $T_5$) may be larger than the range to the OUT (or PULL) direction (for example 1 inch along $T_6$).

According to embodiments of the present disclosure, the teachings of FIGS. 4a-4c, 5a-5c, and 6a-6c can be combined to emulate a continuous three dimension motion of the handheld device. The handheld device may be configured to act as both a game console and a remote controller for the game console in a gaming application.

In one application, the handheld device can be configured to model/emulate golf swings. After determining whether a right-handed or left-handed swing would be performed, the handheld device can be configured to model the trajectory, speed, and accuracy of a golf swing, and collect data about the user's golf swing. The handheld device can then analyze the data and provide feedback for improvement to the user. For example, the data and its corresponding analysis may be wirelessly transmitted to a display device (such as a television) and viewed by the user on the display device.

In another application, the handheld device can be configured to model or emulate tennis swings. After determining whether a right-handed or left-handed swing would be performed, the handheld device can be configured to model the trajectory, speed, and accuracy of a tennis swing, and collect data about the user's swing. For example, the handheld device can be configured to distinguish a right-handed forehand swing from a left-handed backhand swing, and to distinguish a left-handed forehand swing from a right-handed backhand swing. The handheld device can then analyze the data and provide feedback for improvement to the user. For example, the data and its corresponding analysis may be wirelessly transmitted to a display device (such as a television) and viewed by the user on the display device.

In yet another application, the handheld device can be configured to record and store a sequence of handshakes by the user. The user may use the same sequence of handshakes to unlock the handheld device as opposed to typing in a series of keys as a password to unlock the handheld device.

Figure 7B:
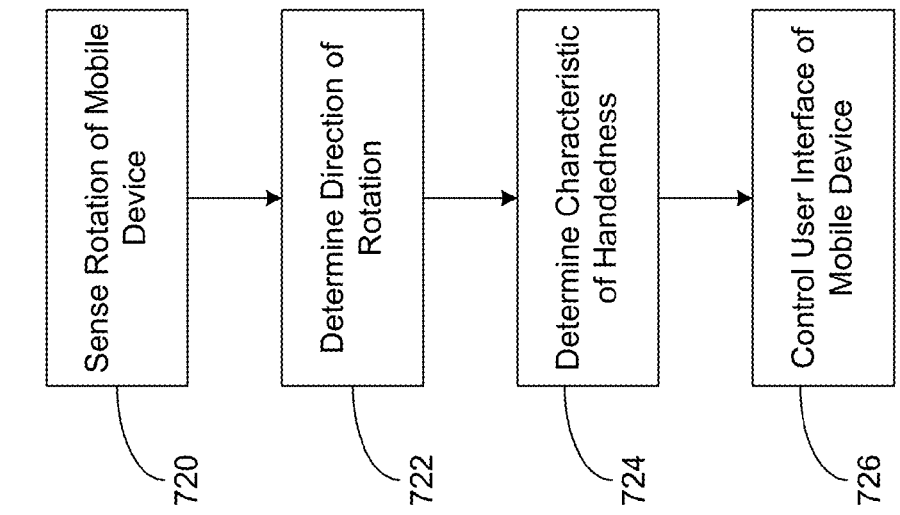
FIG. 7b illustrates a method of determining characteristics of handedness and controlling a mobile device using determined characteristics of handedness according to aspects of the present disclosure.
Figure 7A:
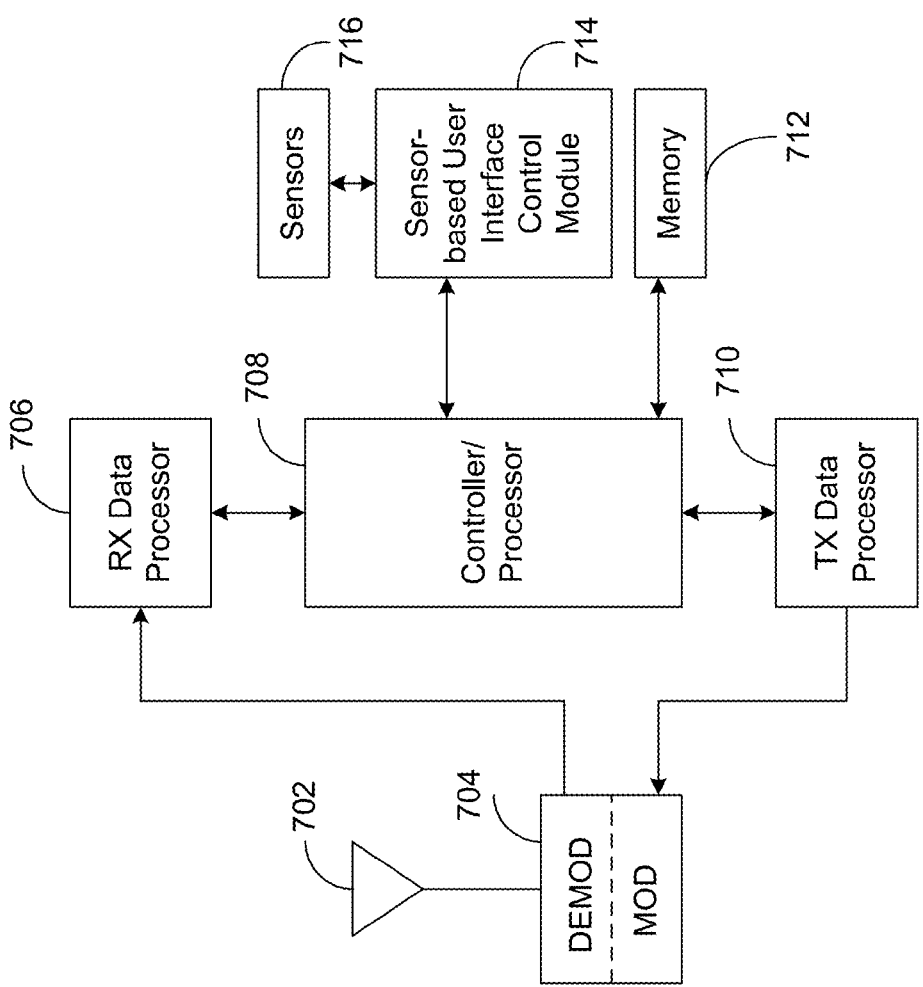
FIG. 7a illustrates a block diagram of a mobile device configured to perform sensor-based user interface control according to some aspects of the present disclosure.

FIG. 7a illustrates a block diagram of a mobile device configured to perform sensor-based user interface control according to some aspects of the present disclosure. At the mobile device, antenna 702 receives modulated signals from a base station and provides the received signals to a demodulator (DEMOD) part of a modem 704. The demodulator processes (e.g., conditions and digitizes) the received signal and obtains input samples. It further performs orthogonal frequency-division multiplexing (OFDM) demodulation on the input samples and provides frequency-domain received symbols for all subcarriers. An RX data processor 706 processes (e.g., symbol de-maps, de-interleaves, and decodes) the frequency-domain received symbols and provides decoded data to a controller/processor 708 of the mobile device.

The controller/processor 708 can be configured to control the mobile device to communicate with a server via a wireless network. A TX data processor 710 generates signaling symbols, data symbols, and pilot symbols, which can be processed by modulator (MOD) of modem 704 and transmitted via the antenna 702 to a base station. In addition, the controller/processor 708 directs the operation of various processing units at the mobile device. Memory 712 can be configured to store program codes and data for the mobile device. Sensor-based user interface control module 714 can be configured to implement methods of determining characteristic of handedness as well as methods of user interface control based on the characteristic of handedness determined as described above in FIGS. 1a-1b to FIGS. 6a-6c. Sensors 716 can be configured to detect a first position state, a second position state, and a direction of rotation as described above in FIGS. 1a-1b to FIGS. 6a-6c.

FIG. 7b illustrates a method of determining characteristics of handedness and controlling a mobile device using determined characteristics of handedness according to aspects of the present disclosure. In block 720, the method senses a rotation of a mobile device. In block 722, the method determines a direction of rotation based at least in part on accessing information indicative of a first position state prior to sensing the rotation and accessing information indicative of a second position state subsequent to sensing the rotation. According to embodiments of the present disclosure, the method identifies a left-hand operation according to a first position state of facing-down and a second position state of facing-up as a result of a counterclockwise rotation; the method identifies a left-hand operation according to a first position state of facing-up and a second position state of facing-down as a result of a clockwise rotation; the method identifies a right-hand operation according to a first position state of facing-down and a second position state of facing-up as a result of a clockwise rotation; and the method identifies a right-hand operation according to a first position state of facing-up and a second position state of facing-down as a result of a counterclockwise rotation.

In block 724, the method determines the characteristic of handedness based at least in part on the direction of rotation, the first position state, and the second position state. The characteristic of handedness includes one of a left handedness or right handedness. In block 726, the method determines a user interface mode based on the characteristic of handedness determined, and controls the mobile device in accordance with the user interface mode determined. For example, the method determines a first angle of expected tilt from a vertical axis according to the first position state, the direction of rotation, and a second position state of a right-hand operation, and controls the mobile device in accordance with the first angle of expected tilt for right-hand operations of the mobile device. For another example, the method determines a second angle of expected tilt from a vertical axis according to the first position state, the direction of rotation, and a second position state of a left-hand operation, and controls the mobile device in accordance with the second angle of expected tilt for left-hand operations of the mobile device. For yet another example, the method stores an operation history of the mobile device over a period of time, determines the characteristic of handedness using the operation history, and controls the mobile device according to the characteristic of handedness determined.

Note that the subsequent three paragraphs, FIGS. 7a-7b and their corresponding descriptions provide means for sensing a rotation of a mobile device, means for determining a direction of rotation based at least in part on means for accessing information indicative of a first position state prior to sensing the rotation and means for accessing information indicative of a second position state subsequent to sensing the rotation, and means for determining the characteristic of handedness based at least in part on the direction of rotation, the first position state, and the second position state. The subsequent three paragraphs, FIGS. 7a-7b and their corresponding descriptions further provide means for determining a user interface mode based on the characteristic of handedness determined, and means for controlling the mobile device in accordance with the user interface mode determined. The subsequent three paragraphs, FIGS. 3a-3b and their corresponding descriptions provide means for determining a first angle of expected tilt from a vertical axis according to the first position state, the direction of rotation, and a second position state of a right-hand operation, and means for controlling the mobile device in accordance with the first angle of expected tilt for right-hand operations of the mobile device. The subsequent three paragraphs, FIGS. 3a-3b and their corresponding descriptions further provide means for determining a second angle of expected tilt from a vertical axis according to the first position state, the direction of rotation, and a second position state of a left-hand operation, and means for controlling the mobile device in accordance with the second angle of expected tilt for left-hand operations of the mobile device. The subsequent three paragraphs, FIGS. 7a-7b and their corresponding descriptions provide means for storing an operation history of the mobile device over a period of time, means for determining the characteristic of handedness using the operation history, and means for controlling the mobile device according to the characteristic of handedness determined.

The handheld device and methodologies described herein can be implemented by various means depending upon the application. For example, these methodologies can be implemented in hardware, firmware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. Herein, the term "control logic" encompasses logic implemented by software, hardware, firmware, or a combination.

For a firmware and/or software implementation, the methodologies can be implemented with modules (e.g., procedures, functions, and so on) that perform the functions described herein. Any machine readable medium tangibly embodying instructions can be used in implementing the methodologies described herein. For example, software codes can be stored in a memory and executed by a processing unit. Memory can be implemented within the processing unit or external to the processing unit. As used herein the term "memory" refers to any type of long term, short term, volatile, nonvolatile, or other storage devices and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media may take the form of an article of manufacturer. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The disclosure may be implemented in conjunction with various wireless communication networks such as a wireless wide area network (WWAN), a wireless local area network (WLAN), a wireless personal area network (WPAN), and so on. The terms "network" and "system" are often used interchangeably. The terms "position" and "location" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network and so on. A CDMA network may implement one or more radio access technologies (RATs) such as cdma2000, Wideband-CDMA (W-CDMA), and so on. Cdma2000 includes IS-95, IS2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

A mobile station refers to a device such as a cellular or other wireless communication device, personal communication system (PCS) device, personal navigation device (PND), Personal Information Manager (PIM), Personal Digital Assistant (PDA), laptop or other suitable handheld device which is capable of receiving wireless communication and/or navigation signals. The term "mobile station" is also intended to include devices which communicate with a personal navigation device (PND), such as by short-range wireless, infrared, wire line connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above are also considered a "mobile station."

Designation that something is "optimized," "required" or other designation does not indicate that the current disclosure applies only to systems that are optimized, or systems in which the "required" elements are present (or other limitation due to other designations). These designations refer only to the particular described implementation. Of course, many implementations are possible. The techniques can be used with protocols other than those discussed herein, including protocols that are in development or to be developed.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the disclosure to the precise forms disclosed. Many modifications and variations are possible in view of the above teachings. The embodiments were chosen and described to explain the principles of the disclosure and their practical applications, and to enable others skilled in the art to best utilize the disclosure and various embodiments with various modifications as suited to the particular use contemplated.

We claim:

1. A method of determining a characteristic of handedness, comprising:
   sensing a rotation of a mobile device;
   determining a direction of rotation based at least in part on
      accessing information indicative of a first position state prior to sensing the rotation; and
      accessing information indicative of a second position state subsequent to sensing the rotation; and
   determining the characteristic of handedness based at least in part on the direction of rotation, the first position state, and the second position state, comprising:
   determining a user interface mode based on the characteristic of handedness determined; and
   controlling the mobile device in accordance with the user interface mode determined, wherein controlling the mobile device comprises:
      setting a first threshold value for a shake in a positive direction of a first axis;
      setting a second threshold value for a shake in a negative direction of the first axis;
      sensing a first valid shake of the mobile device in accordance with the first threshold value and the second threshold value; and
      generating a first command using the first valid shake to control the mobile device.

2. The method of claim 1, wherein the characteristic of handedness comprises one of a left handedness or right handedness.

3. The method of claim 1, wherein controlling the mobile device further comprises:
   setting a third threshold value for a shake in a positive direction of a second axis;
   setting a fourth threshold value for a shake in a negative direction of the second axis;
   sensing a second valid shake of the mobile device in accordance with the third threshold value and the fourth threshold value; and
   generating a second command using the second valid shake to control the mobile device.

4. The method of claim 1, wherein controlling the mobile device further comprises:
   setting a fifth threshold value for a shake in a positive direction of a third axis;
   setting a sixth threshold value for a shake in a negative direction of the third axis;
   sensing a third valid shake of the mobile device in accordance with the fifth threshold value and the sixth threshold value; and
   generating a third command using the third valid shake to control the mobile device.

5. The method of claim 1 further comprises:
   storing an operation history of the mobile device over a period of time;
   determining the characteristic of handedness using the operation history; and
   controlling the mobile device according to the characteristic of handedness determined.

6. A method of determining a characteristic of handedness, comprising:
   sensing a rotation of a mobile device;
   determining a direction of rotation based at least in part on
      accessing information indicative of a first position state prior to sensing the rotation; and
      accessing information indicative of a second position state subsequent to sensing the rotation; and
   determining the characteristic of handedness based at least in part on the direction of rotation, the first position state, and the second position state, comprising:
   determining a user interface mode based on the characteristic of handedness determined; and
   controlling the mobile device in accordance with the user interface mode determined, wherein controlling the mobile device further comprises:
      setting a first threshold value for an angle of motion in a clockwise direction relative to a user;

setting a second threshold value for the angle of motion in a counterclockwise direction relative to the user;

sensing a valid flip of the mobile device in accordance with the first threshold value and the second threshold value; and generating a command using the valid flip to control the mobile device.

7. A method of determining a characteristic of handedness, comprising:

sensing a rotation of a mobile device;

determining a direction of rotation based at least in part on
accessing information indicative of a first position state prior to sensing the rotation; and
accessing information indicative of a second position state subsequent to sensing the rotation; and determining the characteristic of handedness based at least in part on the direction of rotation, the first position state, and the second position state, comprising:

determining a user interface mode based on the characteristic of handedness determined; and controlling the mobile device in accordance with the user interface mode determined, wherein controlling the mobile device further comprises:

setting a first threshold value for a range of motion in a clockwise direction relative to a user;

setting a second threshold value for the range of motion in a counterclockwise direction relative to the user;

sensing a valid flip of the mobile device in accordance with the first threshold value and the second threshold value; and generating a command using the valid flip to control the mobile device.

8. A method of determining a characteristic of handedness, comprising:

sensing a rotation of a mobile device;

determining a direction of rotation based at least in part on
accessing information indicative of a first position state prior to sensing the rotation; and
accessing information indicative of a second position state subsequent to sensing the rotation; and determining the characteristic of handedness based at least in part on the direction of rotation, the first position state, and the second position state, further comprising at least one of:

determining a first angle of expected tilt from a vertical axis according to the first position state, the direction of rotation, and the second position state of a right-hand operation; and controlling the mobile device in accordance with the first angle of expected tilt for right-hand operations of the mobile device; or determining a second angle of expected tilt from the vertical axis according to the first position state, the direction of rotation, and the second position state of a left-hand operation; and controlling the mobile device in accordance with the second angle of expected tilt for left-hand operations of the mobile device.

9. A mobile device, comprising:

one or more sensors configured to sense a first position state, a second position state, and a corresponding direction of rotation of the mobile device;

a processor configured to control operations of the mobile device; and a sensor-based user interface control module configured to control user interface of the mobile device, wherein the sensor-based user interface control module includes logic for sensing a rotation of the mobile device;

logic for determining a direction of rotation based at least in part on
logic for accessing information indicative of the first position state prior to sensing the rotation; and
logic for accessing information indicative of the second position state subsequent to sensing the rotation; and logic for determining a characteristic of handedness based at least in part on the direction of rotation, the first position state, and the second position state, comprising:

logic for determining a user interface mode based on the characteristic of handedness determined; and logic for controlling the mobile device in accordance with the user interface mode determined, wherein logic for controlling the mobile device comprises:

logic for setting a first threshold value for a shake in a positive direction of a first axis;

logic for setting a second threshold value for a shake in a negative direction of the first axis;

logic for sensing a first valid shake of the mobile device in accordance with the first threshold value and the second threshold value; and logic for generating a first command using the first valid shake to control the mobile device.

10. The mobile device of claim 9, wherein the characteristic of handedness comprises one of a left handedness or right handedness.

11. The mobile device of claim 9, wherein logic for controlling the mobile device further comprises:

logic for setting a third threshold value for a shake in a positive direction of a second axis;

logic for setting a fourth threshold value for a shake in a negative direction of the second axis;

logic for sensing a second valid shake of the mobile device in accordance with the third threshold value and the fourth threshold value; and logic for generating a second command using the second valid shake to control the mobile device.

12. The mobile device of claim 9, wherein logic for controlling the mobile device further comprises:

logic for setting a fifth threshold value for a shake in a positive direction of a third axis;

logic for setting a sixth threshold value for a shake in a negative direction of the third axis;

logic for sensing a third valid shake of the mobile device in accordance with the fifth threshold value and the sixth threshold value; and logic for generating a third command using the third valid shake to control the mobile device.

13. The mobile device of claim 9 further comprises:

logic for storing an operation history of the mobile device over a period of time;

logic for determining the characteristic of handedness using the operation history; and logic for controlling the mobile device according to the characteristic of handedness determined.

14. A mobile device, comprising:

one or more sensors configured to sense a first position state, a second position state, and a corresponding direction of rotation of the mobile device;

a processor configured to control operations of the mobile device; and a sensor-based user interface control module configured to control user interface of the mobile device, wherein the sensor-based user interface control module includes logic for sensing a rotation of the mobile device;

logic for determining a direction of rotation based at least in part on
logic for accessing information indicative of the first position state prior to sensing the rotation; and logic for accessing information indicative of the second position state subsequent to sensing the rotation; and
logic for determining a characteristic of handedness based at least in part on the direction of rotation, the first position state, and the second position state, comprising:
logic for determining a user interface mode based on the characteristic of handedness determined; and
logic for controlling the mobile device in accordance with the user interface mode determined, wherein logic for controlling the mobile device further comprises:
    logic for setting a first threshold value for an angle of motion in a clockwise direction relative to the user;
    logic for setting a second threshold value for the angle of motion in a counterclockwise direction relative to the user;
    logic for sensing a valid flip of the mobile device in accordance with the first threshold value and the second threshold value; and
    logic for generating a command using the valid flip to control the mobile device.

15. A mobile device, comprising:
one or more sensors configured to sense a first position state, a second position state, and a corresponding direction of rotation of the mobile device;
a processor configured to control operations of the mobile device; and
a sensor-based user interface control module configured to control user interface of the mobile device, wherein the sensor-based user interface control module includes
logic for sensing a rotation of the mobile device;
logic for determining a direction of rotation based at least in part on
    logic for accessing information indicative of the first position state prior to sensing the rotation; and
    logic for accessing information indicative of the second position state subsequent to sensing the rotation; and
logic for determining a characteristic of handedness based at least in part on the direction of rotation, the first position state, and the second position state, comprising:
logic for determining a user interface mode based on the characteristic of handedness determined; and
logic for controlling the mobile device in accordance with the user interface mode determined, wherein logic for controlling the mobile device further comprises:
    logic for setting a first threshold value for a range of motion in a clockwise direction relative to the user;
    logic for setting a second threshold value for the range of motion in a counterclockwise direction relative to the user;
    logic for sensing a valid flip of the mobile device in accordance with the first threshold value and the second threshold value; and
    logic for generating a command using the valid flip to control the mobile device.

16. A mobile device, comprising:
one or more sensors configured to sense a first position state, a second position state, and a corresponding direction of rotation of the mobile device;
a processor configured to control operations of the mobile device; and
a sensor-based user interface control module configured to control user interface of the mobile device, wherein the sensor-based user interface control module includes
logic for sensing a rotation of the mobile device;
logic for determining a direction of rotation based at least in part on
    logic for accessing information indicative of the first position state prior to sensing the rotation; and
    logic for accessing information indicative of the second position state subsequent to sensing the rotation; and
logic for determining a characteristic of handedness based at least in part on the direction of rotation, the first position state, and the second position state, further comprising at least one of:
    logic for determining a first angle of expected tilt from a vertical axis according to the first position state, the direction of rotation, and the second position state of a right-hand operation; and logic for controlling the mobile device in accordance with the first angle of expected tilt for right-hand operations of the mobile device; or
    logic for determining a second angle of expected tilt from the vertical axis according to the first position state, the direction of rotation, and the second position state of a left-hand operation; and logic for controlling the mobile device in accordance with the second angle of expected tilt for left-hand operations of the mobile device.

17. A computer program product for determining a characteristic of handedness, comprising a non-transitory medium storing computer programs for execution by one or more computer systems, the computer program product comprising:
code for sensing a rotation of a mobile device;
code for determining a direction of rotation based at least in part on
    code for accessing information indicative of a first position state prior to sensing the rotation; and
    code for accessing information indicative of a second position state subsequent to sensing the rotation; and
code for determining the characteristic of handedness based at least in part on the direction of rotation, the first position state, and the second position state, comprising:
code for determining a user interface mode based on the characteristic of handedness determined; and
code for controlling the mobile device in accordance with the user interface mode determined, wherein code for controlling the mobile device comprises:
    code for setting a first threshold value for a shake in a positive direction of a first axis;
    code for setting a second threshold value for a shake in a negative direction of the first axis;
    code for sensing a first valid shake of the mobile device in accordance with the first threshold value and the second threshold value; and
    code for generating a first command using the first valid shake to control the mobile device.

18. The computer program product of claim 17, wherein the characteristic of handedness comprises one of a left handedness or right handedness.

19. A mobile device, comprising:
one or more sensors configured to sense a first position state, a second position state, and a corresponding direction of rotation of the mobile device;
a processor configured to control operations of the mobile device; and
a sensor-based user interface control module configured to control user interface of the mobile device, wherein the sensor-based user interface control module includes
means for sensing a rotation of the mobile device;
means for determining a direction of rotation based at least in part on means for accessing information indicative of the first position state prior to sensing the rotation; and means for accessing information indicative of the second position state subsequent to sensing the rotation; and means for determining a characteristic of handedness based at least in part on the direction of rotation, the first position state, and the second position state, further comprising at least one of:

means for determining a first angle of expected tilt from a vertical axis according to the first position state, the direction of rotation, and the second position state of a right-hand operation; and means for controlling the mobile device in accordance with the first angle of expected tilt for right-hand operations of the mobile device; or means for determining a second angle of expected tilt from the vertical axis according to the first position state, the direction of rotation, and the second position state of a left-hand operation; and means for controlling the mobile device in accordance with the second angle of expected tilt for left-hand operations of the mobile device.

20. The mobile device of claim 19 further comprises:

means for determining a user interface mode based on the characteristic of handedness determined; and means for controlling the mobile device in accordance with the user interface mode determined.

21. The mobile device of claim 19 further comprises:

means for storing an operation history of the mobile device over a period of time;

means for determining the characteristic of handedness using the operation history; and means for controlling the mobile device according to the characteristic of handedness determined.

* * * * *